United States Patent [19]
Fujii et al.

[11] Patent Number: 5,466,388
[45] Date of Patent: Nov. 14, 1995

[54] MATERIAL FOR MAGNETOSTATIC-WAVE DEVICES

[75] Inventors: Takashi Fujii; Masaru Fujino, both of Ohtsu; Takenori Sekijima, Nagaokakyo; Hiroshi Takagi, Ohtsu, all of Japan

[73] Assignee: Murata Mfg. Co., Ltd., Japan

[21] Appl. No.: 238,252

[22] Filed: May 4, 1994

[30] Foreign Application Priority Data

May 7, 1993 [JP] Japan ................................ 5-131400

[51] Int. Cl.⁶ .................................................. C04B 35/26
[52] U.S. Cl. ..................................... 252/62.59; 252/62.57
[58] Field of Search ........................... 252/62.57, 62.59; 117/945; 423/594

[56] References Cited

U.S. PATENT DOCUMENTS

| | | | |
|---|---|---|---|
| 3,006,854 | 10/1961 | Geller | 252/62.57 |
| 3,838,450 | 9/1974 | Bongers et al. | 252/62.57 |
| 4,183,999 | 1/1980 | Ota et al. | 252/62.57 |
| 4,337,521 | 6/1982 | Blank et al. | 252/62.57 |
| 4,968,954 | 11/1990 | Ryuo et al. | 331/107 A |

Primary Examiner—C. M. Bonner
Attorney, Agent, or Firm—Ostrolenk, Faber, Gerb & Soffen

[57] ABSTRACT

A material for magnetostatic wave devices comprises a thin single-crystalline magnetic film consisting essentially of a magnetic garnet containing iron, and at least one element of zirconium and hafnium incorporated therein. The content of zirconium and/or hafnium is less than or equal to 1000 wt.ppm.

6 Claims, 2 Drawing Sheets

MATERIAL FOR MAGNETOSTATIC-WAVE DEVICES

FIELD OF THE INVENTION

The present invention relates to a material for magnetostatic wave devices and, more particularly, a thin single-crystalline magnetic garnet films used for magnetostatic wave devices.

DESCRIPTION OF THE PRIOR ART

As an essential material for magnetostatic wave devices, there have widely been used single-crystalline thin films of yttrium-iron-garnet ($Y_3Fe_5O_{12}$, hereinafter referred to as "YIG") because of its very small magnetic resonance half linewidth ($\Delta H$). That is, YIG makes it possible to minimize the difference between input and output signals of magnetostatic wave elements. In order to improve magnetic properties of YIG, there have recently been proposed various magnetic garnets containing iron, i.e., rare earth element-iron garnets (hereinafter referred to as "RIG"). For example, in U.S. Pat. No. 4,968,954 and U.S. Ser. No. 08/089,701, there have been proposed yttrium-based magnetic garnets with the formula: $(Y_{3-x}Me_x)(Fe_{5-y}Me'_y)O_{12}$ where Me is at least one trivalent element selected from the group consisting of Bi, Sb, and lanthanoid (La, Ce, Pr, Nd, Pm, Sm, Eu, Gd, Tb, Dy, Ho, Er, Tm, Yb, Lu), Me' is at least one metal selected from the group consisting of Ga, Al and other metals capable of being incorporated as donor atoms into a crystal structure containing six or four donor atoms, and x and y take a value within the respective following ranges: $0<x\leq0.5$, and $0<y\leq1.0$.

Such thin single-crystalline films of RIG are generally produced by the liquid phase epitaxy (hereinafter referred to as "LPE") which includes the steps of dissolving raw materials such as ferric oxide ($Fe_2O_3$) and diyttrium trioxide ($Y_2O_3$) in a molten solvent composed of lead monoxide (PbO) and diboron trioxide ($B_2O_3$), and immersing a single-crystalline substrate of gadolinium-gallium-garnet ($Gd_3Ga_5O_{12}$, hereinafter referred to as "GGG") into the melt to deposit a single-crystalline thin film of YIG to form a magnetic garnet film epitaxially grown on the GGG substrate.

However, such materials occasionally make it difficult to achieve the desired magnetic properties or superior reproducibility even if they were epitaxially grown under the same conditions or subjected to the same thermal histories after deposition of the films. This results in wide variation of the magnetic properties, causing lowering of the characteristics of magnetostatic wave devices.

SUMMARY OF THE INVENTION

It is therefore an essential object of the present invention to provide a material for magnetostatic-wave devices with improved magnetic characteristics.

According to the present invention there is provided a material for magnetostatic wave devices, comprising a thin single-crystalline magnetic film consisting essentially of a magnetic garnet containing iron, and at least one element of zirconium (Zr) and hafnium (Hf) incorporated therein.

As the magnetic garnet containing iron, there may be used any rare earth element-iron garnet (RIG). Typical RIG are yttrium-based magnetic garnets of the general formula: $(Y_{3-x}Me_x)(Fe_{5-y}Me'_y)O_{12}$ where Me is at least one trivalent element selected from the group consisting of Bi, Sb, and lanthanoid (La, Ce, Pr, Nd, Pm, Sm, Eu, Gd, Tb, Dy, Ho, Er, Tm, Yb, Lu), Me' is at least one metal selected from the group consisting of Ga, Al and other metals capable of being incorporated as donor atoms into a garnet structure containing six or four donor atoms, and x and y take a value within the respective following ranges: $0\leq x\leq1.0$, and $0\leq y\leq1.0$. Among them, it is preferred to use yttrium-based magnetic garnets of the general formula: $Y_{3-x}Me_xFe_{5-y}Me'_yO_{12}$ where Me is at least one trivalent element selected from the group consisting of Bi, Gd, Lu, Sc and La, Me' is Ga and/or Al, $0\leq x\leq1$, and $0\leq y\leq1$.

Preferably, Zr and/or Hf is incorporated into RIG in an amount of less than or equal to 1000 wt.ppm, preferably less than 100 wt.ppm.

According to the present invention, the incorporation of Zr and/or Hf has been made for the following reasons. In general, iron exhibits two valences, i.e., bivalence and trivalence, and varies easily from bivalent ions to trivalent ions or vice versa according to the surroundings. In the magnetic garnet, theoretically, iron should be present in the trivalent state since other elements (e.g., yttrium and oxygen) present in the positive trivalent state and negative bivalent state, respectively. However, trivalent iron ions ($Fe^{3+}$) are easily reduced to bivalent ions ($Fe^{2+}$) by the growth conditions or thermal histories thereafter, the results would be ununiformity of the magnetic properties of the single crystalline RIG thin films. For example, if a part of Fe, x, in YIG varied from trivalent ions to bivalent ions, the electrical equilibrium is given by formula (1):

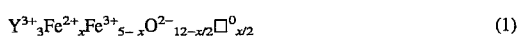

where the sum of positive charges and negative charges becomes 0. From the standpoint of the neutralization of electrical charges, the composition is short of oxygen atoms entering the oxygen lattice by x/2. In order to make up for deficiency, point defects with no charges, so-called Schottky defects, are produced in the crystal by x/2, as expressed by $\square^0$ in Formula (1) because, the single-crystalline thin films of YIG containing $Fe^{2+}$ are chemically stabilized by the presence of such point defects in the crystal structure. However, the presence of point defects causes generation of local nuclear spins, resulting in considerable lowering of magnetostatic wave characteristics of the YIG film.

Such a problem is solved by incorporating Zr and/or Hf into RIG in accordance with the present invention. For example, if Zr is incorporated into YIG in an amount equal to that of $Fe^{2+}$, the electrical equilibrium of formula (1) would be rewritten by formula (2):

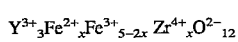

In this case, there is no point defect and the equilibrium condition for charges is satisfied by the presence of Zr. The same result can be obtained by incorporation of Hf into YIG. Zr and Hf exhibit tetravalency and their tetravalent ions are very stable and never change to other valency. In addition, both Zr and Hf have an atomic radius of 0.155 nm, which is slightly greater than that of Fe (0.14 nm), and thus they occupies Fe sites in the stable state. Accordingly, the incorporation of Zr and/or Hf makes it possible to produce a material for magnetostatic wave devices with excellent magnetic properties.

On the other hand, there are known other elements exhibiting tetravalency, e.g., Ti, Si and Ge. Although Ti is an element of the group IV metals as well as Zr and Hf and has an atomic radius of 0.14, equal to atomic radius of Fe, it exhibits trivalence or tetravalence according to the environment, thus making it impossible to obtain the same effect as that of Zr and Hf. Si and Ge are stable in the tetravalent state, but they cannot occupy Fe sites in the stable state because of their atomic radii considerably smaller than that of Fe. That is, Si has an atomic radius of 0.11 nm, while Ge has an atomic radius of 0.125 nm.

The material of present invention makes it possible to produce thin films of RIG with greatly improved magnetic properties. This makes it possible to produce magnetic wave devices with stable and uniform characteristics at high yield.

The above and other objects, features and advantages of the present invention will be understood clearly from the following explanations with reference to preferred examples thereof.

DETAILED DESCRIPTION OF THE PREFERRED EXAMPLES

Example 1

Using powders of $Fe_2O_3$, $Y_2O_3$ and $ZrO_2$ as raw materials for a solute, there were prepared specimens of Zr-modified YIG films in the following manner: The raw materials $Fe_2O_3$, $Y_2O_3$ and $ZrO_2$ were weighed and mixed so that the resultant single-crystalline thin film has a composition of $Y_3{}^{3+}Fe^{2+}{}_xFe^{3+}{}_{5-2x}Zr^{4+}{}_xO^{2-}{}_{12}$ in which x=0.001. The resultant mixture was put into a platinum crucible along with a mixture of PbO and $B_2O_3$ serving as a solvent, heated to 1200° C. in an electric furnace to prepare a homogeneous melt, cooled to the crystal growth temperature of 900° C. and then kept at that temperature to make the garnet have a supersaturated state. After this, a single-crystalline GGG substrate was immersed in the melt for a certain period of time to prepare a zirconium modified YIG thin film epitxially grown on the substrate. The substrate was then drawn up from the melt, rotated at a high rate of revolution to remove the melt from the surface of the magnetic garnet film, and then cooled to room temperature.

Analysis of the thin single-crystalline garnet film showed that the content of Zr is about 120 wt.ppm.

Comparative Example 1

Using powders of $Fe_2O_3$ and $Y_2O_3$ as raw materials for a solute, there were prepared thin single-crystalline films of YIG in the same manner except for zirconium oxide being removed from the composition.

Figure 1:
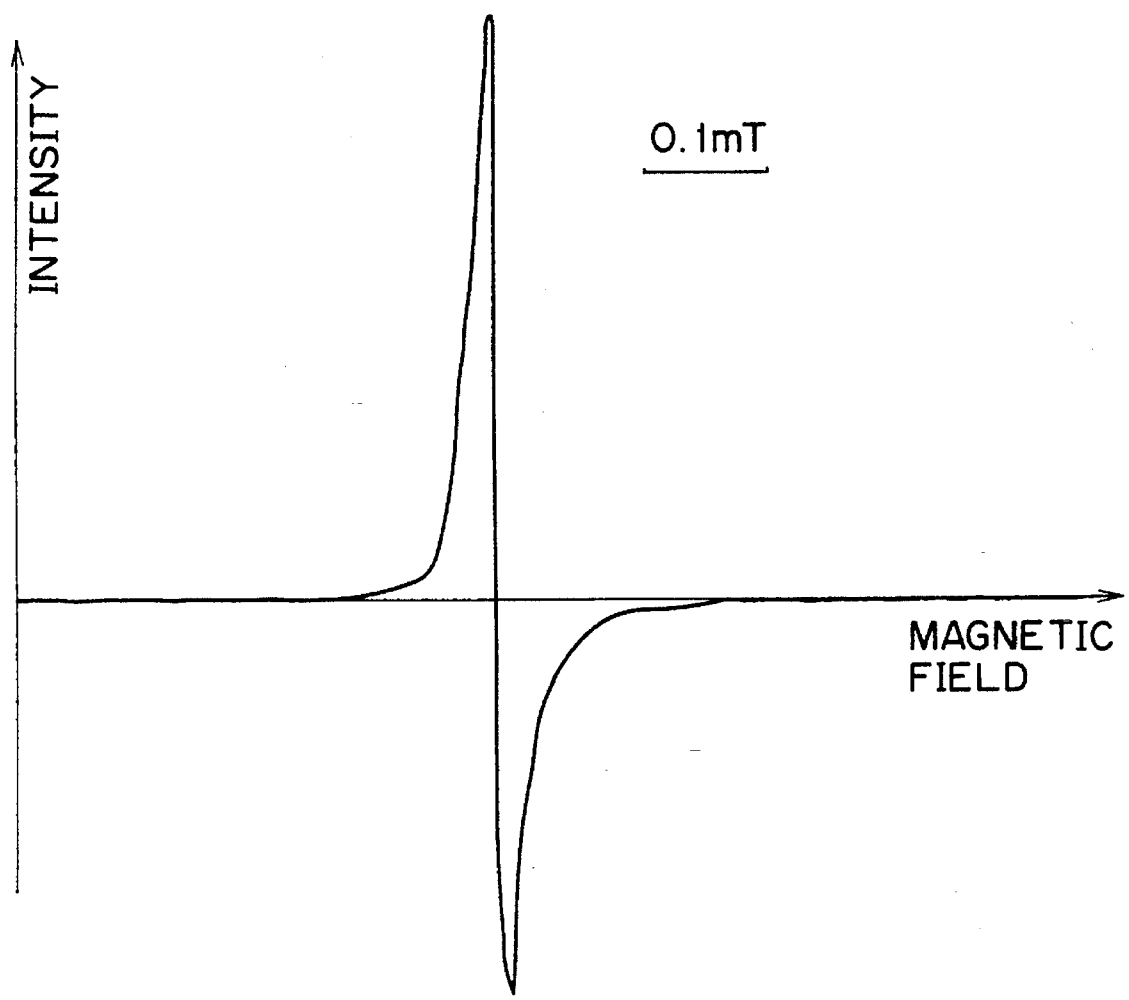
FIG. 1 is a graph showing ferromagnetic resonance spectrum (Lorentz type) of a thin single-crystalline film of a magnetic garnet according to the present invention.
Figure 2:
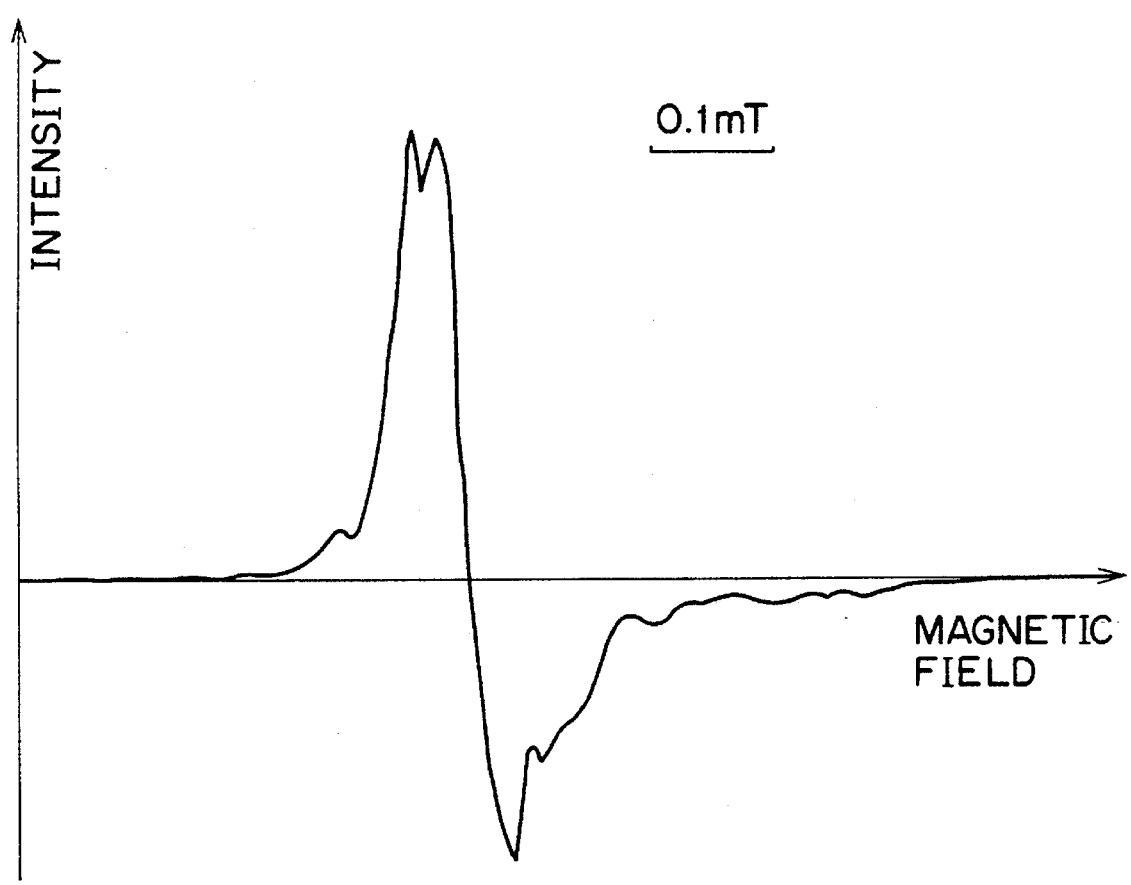
FIG. 2 is a graph showing ferromagnetic resonance spectrum (Lorentz type) of a thin single-crystalline films of YIG of the prior art.

For each of the resultant magnetic garnet films, ferromagnetic resonance spectrum was observed with an electron spin resonance (ESR) system. The results are shown in FIGS. 1 and 2. FIG. 1 is a graph showing a ferromagnetic resonance spectrum (Lorentz type) of the garnet film of example 1, while FIG. 2 is a graph showing a ferromagnetic resonance spectrum (Lorentz type) of the garnet film of comparative example 1.

From the results shown in FIGS. 1 and 2, it will be seen that the ferromagnetic resonance spectrum of the thin single-crystalline film of example 1 possesses one peak, while the ferromagnetic resonance spectrum of the thin single-crystalline film of comparative example possesses two peaks.

Then, the resultant magnetic garnet films were thermally treated in air at 950° C. for 6 hours to determine the stability of their magnetic properties. The observation of the magnetic thin single-crystalline films with the ESR system showed that the ferromagnetic resonance spectrum of the magnetic garnet film of example 1 is scarcely affected by the thermal treatment, while the magnetic thin single-crystalline film of comparative example 1 is greatly changed by the thermal treatment.

As will be understood from the above, according to the present invention, YIG is greatly improved in magnetic properties by incorporation of zirconium and/or hafnium, and thus the use of such thin single-crystalline films making it possible to produce magnetostatic-wave devices with stabilized magnetic characteristics at high yield and at a lower cost.

In the above example, zirconium is used as a valency-balancing agent. However, similar effects can be obtained by incorporation of hafnium solely or in combination with zirconium. Further, the present invention can be applied to thin single-crystalline films of yttrium-based magnetic garnets of the formula $(Y_{3-x}A_x)(Fe_{5-y}B_y)O_{12}$, though the above example showed incorporation of Zr into the thin single-crystalline film of YIG.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A material for magnetostatic wave devices, comprising a thin single-crystalline magnetic film consisting essentially of a magnetic garnet containing iron, and at least one element of zirconium and hafnium incorporated therein wherein the content of said at least one element of zirconium and hafnium is less than or equal to 1000 wt.ppm and wherein said magnetic garnet is an yttrium-based magnetic garnet of the general formula: $(Y_{3-x}Me_x)(Fe_{5-y}Me'_y)O_{12}$ where Me is at least one trivalent element selected from the group consisting of Bi, Sb, and lanthanoid (La, Ce, Pr, Nd, Pm, Sm, Eu, Gd, Tb, Dy, Ho, Er, Tm, Yb, Lu), Me' is at least one metal selected from the group consisting of Ga and Al and x and y take a value within the respective following ranges: $0 \leq x \leq 1.0$, and $0 \leq y \leq 1.0$.

2. The material for magnetostatic wave devices according to claim 1 wherein said magnetic garnet is an yttrium-based magnetic garnet of the general formula: $Y_{3-x}Me_xFe_{5-y}Me'_yO_{12}$ where Me is at least one trivalent element selected from the group consisting of Bi, Gd, Lu, Sc and La, Me' is Ga and/or Al, $0 \leq x \leq 1$, and $0 \leq y \leq 1$.

3. The material for magnetostatic wave devices according to claim 1 wherein the content of said at least one element of zirconium and hafnium is less than 100 wt.ppm.

4. The material for magnetostatic wave devices according to claim 1 of the formula $Y_3Fe^{2+}{}_{0.001}Fe^{3+}{}_{4.998}Zr_{0.001}O_{12}$.

5. The material for magnetostatic wave devices according to claim 1 wherein said at least element of zirconium and hafnium is zirconium.

6. The material for magnetostatic wave devices according to claim 1 wherein said at least element of zirconium and hafnium is hafnium.

* * * * *